United States Patent
Brown et al.

(10) Patent No.: US 7,096,289 B2
(45) Date of Patent: Aug. 22, 2006

(54) SENDER TO RECEIVER REQUEST RETRY METHOD AND APPARATUS

(75) Inventors: Jeffrey Douglas Brown, Rochester, MN (US); Philip Rogers Hillier, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 10/346,293

(22) Filed: Jan. 16, 2003

(65) Prior Publication Data

US 2004/0143691 A1    Jul. 22, 2004

(51) Int. Cl.
*G06F 13/00* (2006.01)

(52) U.S. Cl. .................. 710/107; 710/110; 710/240

(58) Field of Classification Search ............... 710/110, 710/113, 240–244, 118, 125; 712/28–31; 714/748
See application file for complete search history.

(56) References Cited

U.S. PATENT DOCUMENTS

| | | | | |
|---|---|---|---|---|
| 4,281,380 A | * | 7/1981 | DeMesa et al. | 710/119 |
| 5,293,621 A | * | 3/1994 | White et al. | 710/107 |
| 5,555,420 A | * | 9/1996 | Sarangdhar et al. | 710/266 |
| 5,623,628 A | | 4/1997 | Brayton et al. | |
| 5,623,694 A | * | 4/1997 | Arimilli et al. | 710/5 |
| 5,706,446 A | * | 1/1998 | Kalish et al. | 710/113 |
| 5,717,872 A | * | 2/1998 | Whittaker | 710/105 |
| 5,727,203 A | | 3/1998 | Hapner et al. | |
| 5,748,900 A | * | 5/1998 | Scott et al. | 709/235 |
| 5,764,929 A | * | 6/1998 | Kelley et al. | 710/107 |
| 5,771,235 A | * | 6/1998 | Tang et al. | 370/446 |
| 5,842,026 A | * | 11/1998 | Wong-Chan et al. | 710/260 |
| 5,884,052 A | * | 3/1999 | Chambers et al. | 710/107 |
| 5,889,972 A | * | 3/1999 | Allingham | 710/311 |
| 5,941,967 A | * | 8/1999 | Zulian | 710/107 |
| 6,021,483 A | * | 2/2000 | Adar et al. | 712/29 |
| 6,081,859 A | * | 6/2000 | Munguia | 710/107 |
| 6,112,272 A | * | 8/2000 | Gates | 710/110 |
| 6,141,715 A | * | 10/2000 | Porterfield | 710/113 |
| 6,282,598 B1 | * | 8/2001 | Manabe | 710/107 |
| 6,289,406 B1 | * | 9/2001 | Chambers et al. | 710/107 |
| 6,397,279 B1 | * | 5/2002 | Jaramillo et al. | 710/110 |
| 6,539,444 B1 | * | 3/2003 | Kondo et al. | 710/110 |
| 6,598,104 B1 | * | 7/2003 | Jaramillo et al. | 710/110 |
| 6,633,936 B1 | * | 10/2003 | Keller et al. | 710/107 |
| 6,728,808 B1 | * | 4/2004 | Brown | 710/107 |
| 6,816,954 B1 | * | 11/2004 | Solomon | 711/167 |
| 2003/0101400 A1 | * | 5/2003 | Anjo et al. | 714/749 |
| 2004/0025099 A1 | * | 2/2004 | Aikawa et al. | 714/748 |

FOREIGN PATENT DOCUMENTS

| | | | | |
|---|---|---|---|---|
| EP | 1191454 A2 | * | 3/2002 | |
| JP | 09114750 A | * | 5/1997 | |
| JP | 411345198 A | * | 12/1999 | |
| JP | 2001333136 A | * | 11/2001 | |
| JP | 2002149480 A | * | 5/2002 | |

* cited by examiner

*Primary Examiner*—Paul R. Myers
*Assistant Examiner*—Ryan Stiglic
(74) *Attorney, Agent, or Firm*—Carr LLP; Diana R. Gerhardt

(57) ABSTRACT

Disclosed is a method for and an apparatus using various factors including system performance feedback data to optimize the time suggested to attempt retry of a request. Among the factors used there is included present system performance, type of request, status of pending action, current number of retries pending, a predefined fixed interval, a pseudo random interval, a random interval, past history of retry requests, heuristically determined interval, and an interval based upon hang detection.

12 Claims, 3 Drawing Sheets

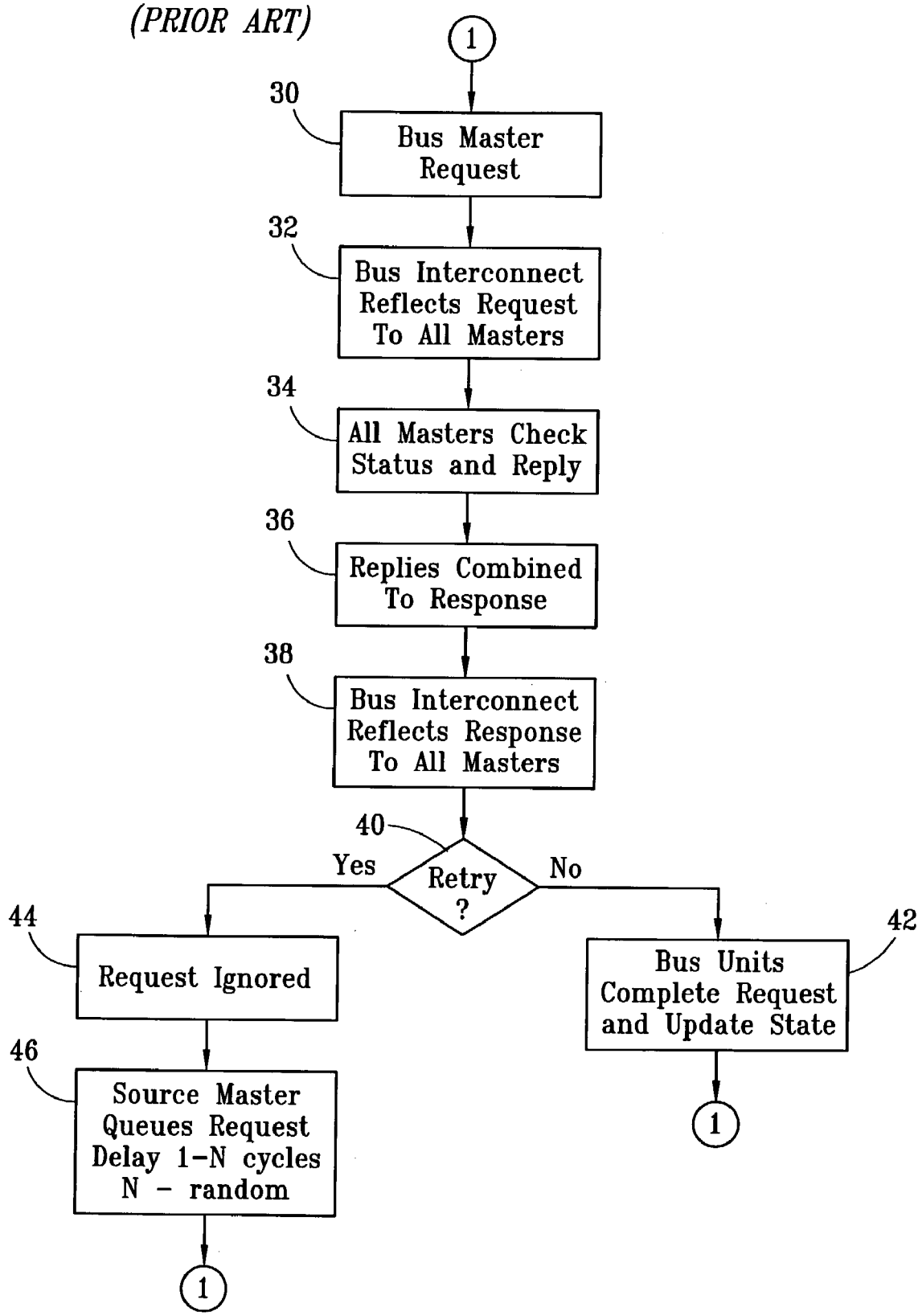

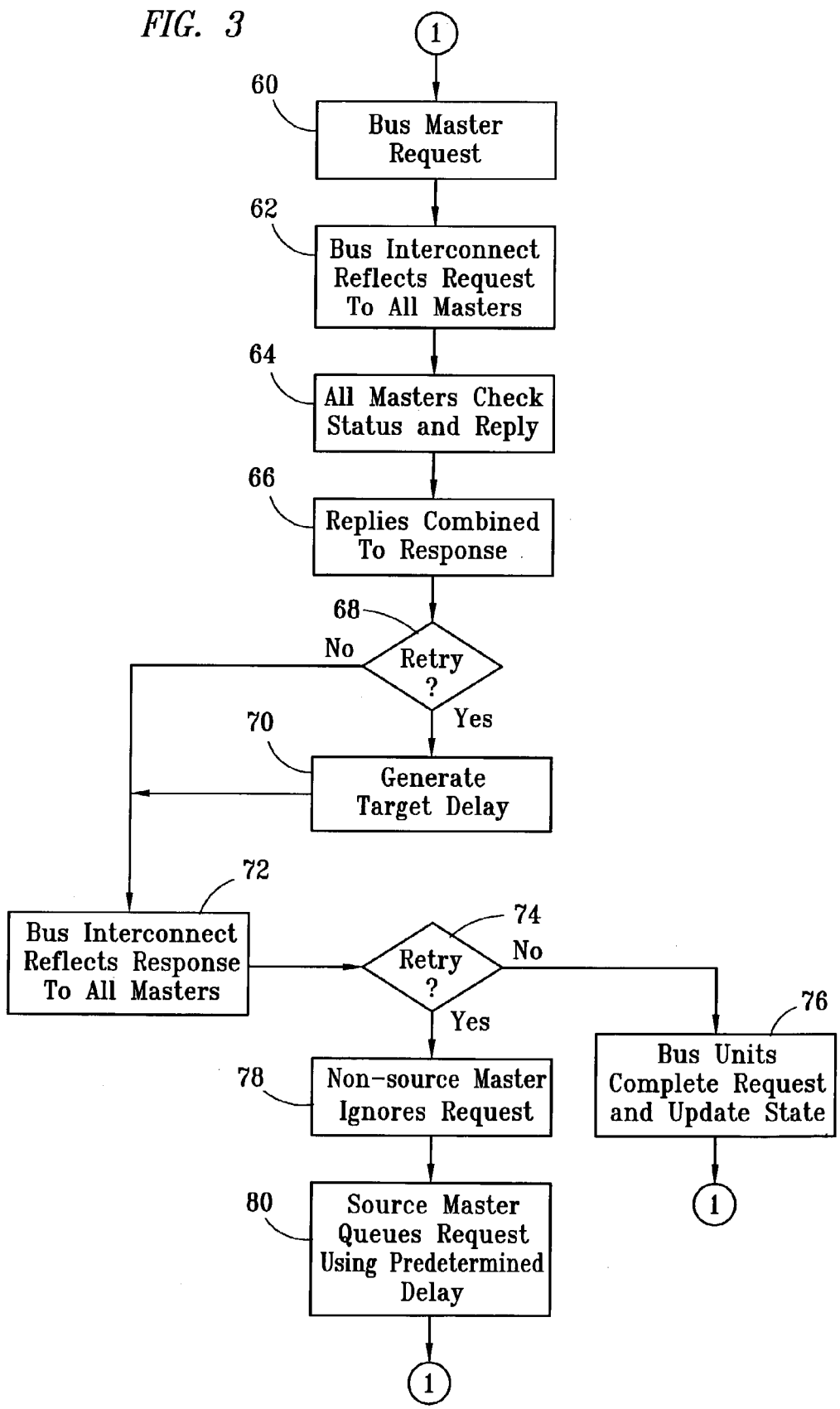

SENDER TO RECEIVER REQUEST RETRY METHOD AND APPARATUS

TECHNICAL FIELD

The invention relates to inter device communications and, more particularly, to management of a communication request after a command request or other requested action is rejected because of a conflicting condition.

BACKGROUND

Within typical multiprocessor systems, the system bus is used to communicate commands to be processed by the processors. Depending on the state of a given PU (processor unit) or other bus master to which the request is directed, the response to a given command may be an indication that this command cannot be processed at this time because of some conflicting condition. The requesting PU must then "retry" the command. Attempting to immediately retry will normally cause a livelock condition, thereby degrading the performance of the bus.

A prior art known approach to alleviating this problem is to have the requesting unit delay a "random" amount of time before reissuing the command. The problem with this approach is that, in some situations, the random time may be too soon and, in other operationally critical situations, the random time may be too long.

It would be desirable that the retry interval be related to the type of command to be executed and/or other factors that could affect the likelihood that the request for action be completed at the time of the retry. It would further be desirable that the retry mechanism could provide dynamic adjustment of the retry interval based upon past experience for different types of commands and/or for given associated bus masters.

SUMMARY OF THE INVENTION

The present invention comprises using a PU control mechanism for allowing adjusting inter processors command retry communications based upon at least one of type of command and dynamic feedback related to past experience in retry intervals for given types of commands and/or communications with given associated PUs.

BRIEF DESCRIPTION OF THE DRAWINGS

For a more complete understanding of the present invention, and its advantages, reference will now be made in the following Detailed Description to the accompanying drawings, in which:

FIG. 2 is a flow representative of the retry mechanism of a typical prior art multiprocessor system; and FIG. 3 is a high level flow diagram used in describing the retry mechanism of the present invention in a multiprocessor system.

DETAILED DESCRIPTION

Figure 1:
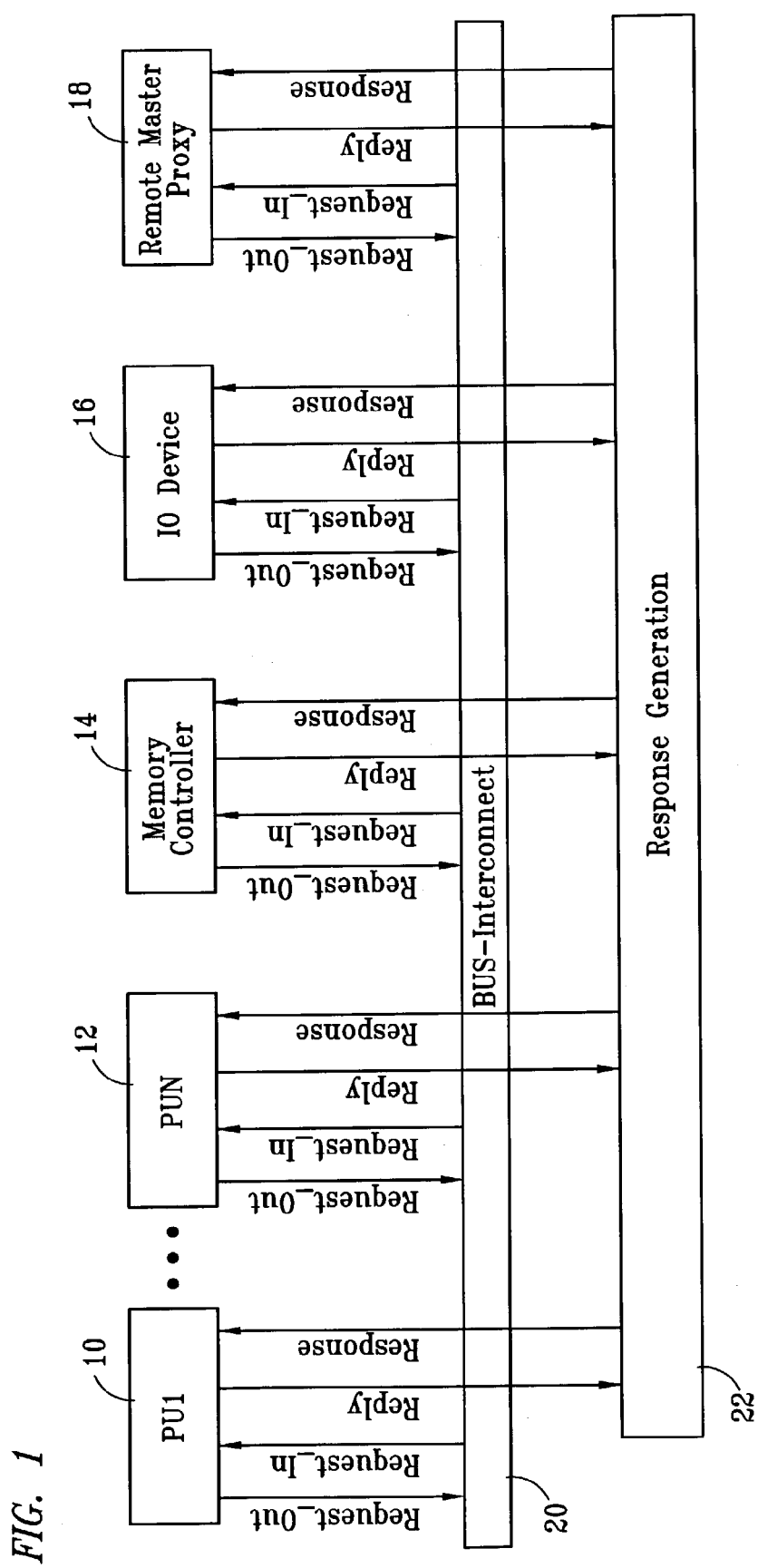
FIG. 1 is a block diagram broadly showing the interconnection of portions of a typical multiprocessor system for use in explaining the present invention.

In FIG. 1 there is shown a block PU1 (processor unit 1) designated as 10 and a further block PUN designated as 12 with 3 dots therebetween indicating that there may be many more PUs. Additional intelligent agents or devices that may be involved in a request retry process include blocks such as a memory controller 14, IO (input/output) devices represented by a block 16 and a remote master proxy block 18. Each of the devices 10 through 18 may be termed a bus master. Any bus master may provide output information to a bus interconnect block 20 via a RO (Request_Out) connection and receive information from bus 20 via a RI (Request_In) connection. Further, each of the bus masters may provide an output reply to a Response Generation block 22 and receive a response from the block 22. The block 22 typically combines the reply of all the bus masters in an intelligent manner and provides a combined response to each of the bus masters.

FIG. 2 will be discussed in combination with FIG. 1. As shown in the flow diagram of FIG. 2, one of the bus masters makes a request as presented in a block 30. In the prior art, this request is typically a command to another bus master to do something such as store or fetch data from memory. As shown in a succeeding block 32, the bus interconnect block 20 distributes or provides the request to all bus masters. Next, as shown in block 34, all the bus masters check the status of their situation regarding the request and provide a reply to the response generation block 22.

As an example, one bus master may request that data be changed in a database that other devices are presently using. In some situations, the use by other bus masters may prevent the change. In other situations, it is merely necessary that other bus masters using the data be aware that they need to update their data in accordance with the requested change. The replies of all the bus masters are combined in block 22 as presented in a block 36. This combined response is provided to all bus masters as shown in a block 38.

As part of this combined response, there is an indication of whether or not the request must be retried at a later date as shown by a retry block 40. If no retry is indicated, in other words the request command has succeeded, all the bus units complete the request and update their state, as shown in a block 42. On the other hand, if a retry is indicated in the response, the request is ignored by all the bus masters other than the unit requesting the action, as shown in a block 44. The requesting master then queues the request delayed by a random generated time, as shown in a block 46.

The action upon the completion of either of blocks 42 and 46 is to return to block 30 where the same or a different bus master may make a request for action by another unit. It may be noted that when there is no reply provided, such as where the bus is overwhelmed with communications, the lack of response is detected by the requesting master when a timeout has occurred and a checkstop, or error handling mechanism, is invoked by that bus master unit.

Reference will now be made to FIG. 3 in combination with FIG. 1. As may be noted, the first four steps of FIG. 2 (blocks 30, 32, 34 and 36) correspond identically with blocks designated as 60, 62, 64 and 66 in FIG. 3. The present invention, however, alters the cycle in the response generation unit 22, as shown by a retry block 68, and a subsequent generate target delay block 70 for the situation where the combined response illustrates to the response generation unit that a retry is necessary.

As will be explained presently, if a retry is required, the block 22 will determine an appropriate time at which a retry request should be made based upon various factors to be explained infra. The process then continues to block 72 where the response generated is supplied to all bus masters in substantially the same manner as in FIG. 2. If no retry is determined to be necessary in block 68, the next step is likewise to provide this information to the step presented in block 72. Each of the remaining blocks 74, 76, 78 and 80 correspond in action to the prior art functions detailed in blocks identically labeled blocks 40, 42, 44 and 46.

In instances where a retry is determined to be required, the response generation block 22, as part of the present invention, generates a specified target delay time for the requesting bus master to again attempt to send a request. In determining the delay time for a retry, the block 22 will examine factors determined by the system designer to be critical in optimizing the retry interval. The type of request may well be a factor in the timing. It may be determined that a store request should be retried sooner than a fetch request. A delete data request may be determined to be less critical or more critical than either a fetch or store request. Another factor might be how fully the bus is presently being utilized. Thus, the retry interval might be determined to be shorter if the bus is being utilized at less than 90 percent capacity than if it is being utilized at more than 90 percent capacity. The number of retries that have been generated in the recent past may also be a factor used in generating a suggested retry interval to the requesting master. Thus, if a great number of retry responses have been recently sent, the suggested retry interval may be greater for the present master, for a given type of event, than suggested to other masters in the recent past.

If the block 22 detects a "hang" or other livelock condition, it may well be deemed desirable to increase the retry time based on this factor. The responses from the other masters may indicate that other actions cannot be completed until the present request is completed. Thus the suggested retry time might be lessened from that normally suggested based on other factors used. It is to be noted that the above-suggested factors are not exclusive of other factors that may be deemed desirable for use in ascertaining a suggested retry delay.

In calculating the delay, the block 22 may use, as potential examples, the following components: (a) a fixed delay; (b) a pseudo random delay between given limits; (c) status of system performance indicators like bus utilization, current retry rate and hang detection; (d) the type of requested action; and (e) the status of a pending action. If the above components are used, the system may combine (a) and (b) to allow a specified fixed delay for each given type of command request. This suggested retry delay may have a further fixed delay, in addition to the delay introduced by other factors, whenever the bus utilization exceeds 90 percent.

Another approach to calculating the suggested retry delay is to use the pseudo random delay of (b) in conjunction with a given fixed delay whenever the percentage of retries in a stream of commands exceeds five percent. A different calculation might be used for the situation of when a fetch misses an access to an integral cache and the fetch must be made from memory. In such a situation, it might be appropriate to combine (a) and (b) because of the status of that pending action (i.e. (e)).

From the above, it will be apparent that the calculation of suggested retry delay is dynamic in that it may be affected by system performance factors. A more complex heuristic calculation may also include data related to the number of retries a master had to make before a successful retry occurred for a given set of conditions in a prior situation, when setting the retry interval for succeeding retry.

It may be noted that block 70 generates a "suggested" retry time. The term suggested is used because other factors may prevent the requesting master from retrying the requested command at the suggested time. However, typically the master will retry as soon as convenient after the suggested retry time has elapsed.

While a prime example of the use of this invention is for the retry of commands, it may advantageously be used for other situations such as the transmission of data packets.

Further, while the retry has only been described in connection with requests that have been responded to the other bus masters, the invention includes adjusting the retry time for the situation where a reply timeout is exceeded and no reply is detected by block 22.

As may be concluded, the present invention thus comprises a mechanism which changes the retry interval as a function of one or more plurality of factors, parameters and/or events. The plurality of factors may include at least present system performance, type of request, status of pending action, current number of retries pending, a predefined fixed interval, a pseudo random interval, a random interval, past history of retry requests, and an interval based upon hang detection. It further allows adjustment of the retry interval under dynamic feedback (heuristically) thus allowing optimization of the retry intervals to minimize the number of repeated retries while minimizing the interval and thus reducing the latency.

Although the invention has been described with reference to a specific embodiment, the description is not meant to be construed in a limiting sense. Various modifications of the disclosed embodiment, as well as alternative embodiments of the invention, will become apparent to persons skilled in the art upon reference to the description of the invention. It is therefore contemplated that the claims will cover any such modifications or embodiments that fall within the true scope and spirit of the invention.

What is claimed is:

1. A method for dynamic control of retry intervals in a symmetrical multiprocessor, comprising:
   generating a first request from a requesting microprocessor for processing by a second microprocessor;
   generating from the second microprocessor a denial of service;
   generating a next request from the requesting microprocessor for processing by said second microprocessor a variable interval from the first request; and
   wherein said interval is determined from one of a preselected set of intervals comprising fixed, pseudo random, heuristic and hang detection.

2. A computer program product for control of inter device communication retry intervals in a multiprocessor system, the computer program product having a computer readable medium with a computer program embodied thereon, the computer program comprising:
   computer code for generating a first request from a requesting device for action by a second device;
   computer code for receiving an indication at said requesting device that said second device could not act on the request; and
   computer code for repeating the request at an interval of time of variable duration and where the duration is determined from one of a preselected set of durations comprising fixed, pseudo random, heuristic and hang detection.

3. Apparatus for control of inter device communication retry intervals, comprising:
   a communication bus;
   a plurality of processors communicating action requests with one another via said communication bus, and each processor including a suggested retry response input;

reply means comprising a part of each of said processors whereby negative and positive action replies are generated with respect to received requests for action; and response generation means, connected to the reply means and the suggested retry response input of each of said processors, the response generation means operating, upon receipt of a negative action reply, to generate a suggested request retry interval of variable duration which duration is determined from one of a preselected set of durations comprising fixed, pseudo random, heuristic and hang detection.

4. A method for control of inter device communication retry intervals, comprising:

sending an inter processor request via a communication bus to all other processors;

generating a reply from each processor relative to the request;

consolidating the data contained within all the replies in a response generator; and formulating a suggested retry interval response, when one or more negative replies to the requested action are received by the response generator, where the suggested request retry interval is of variable duration and the duration is determined from one of a preselected set of durations comprising fixed, pseudo random, heuristic and hang detection.

5. The method of claim 4, wherein:

the plurality of factors include one or more of present system performance, type of request, status of pending action and current number of retries pending.

6. The method of claim 4, wherein:

the suggested retry time interval is heuristically altered from previously suggested time intervals for a given set of factors based upon the number of retries prior to a successful retry.

7. A method for control of inter device communication retry intervals in a multiprocessor system, comprising:

generating a first request from a requesting device for action by a second device;

receiving an indication at said requesting device that said second device could not act on the request; and repeating the request at an interval of time of variable duration and where the duration is determined from one of a preselected set of durations comprising fixed, pseudo random, heuristic and hang detection.

8. The method of claim 7, wherein:

the plurality of factors include one or more of present system performance, type of request, status of pending action, current number of retries pending, a predefined fixed interval, a pseudo random interval, a random interval, past history of retry requests, heuristically determined interval, and an interval based upon hang detection.

9. A method for control of inter device communication retry intervals in a multiprocessor system, comprising:

generating a first request from a requesting device for action by a second device;

receiving an indication at said requesting device that said second device could not act on the request; and repeating the request at an interval of time of variable duration; and wherein the duration is a function of three or more factors; and wherein the three or more factors include a pseudo random interval, an interval based upon hang detection, and at least one of present system performance, type of request, status of pending action, current number of retries pending, a predefined fixed interval, a random interval, past history of retry requests, and a heuristically determined interval.

10. The method of claim 9, wherein:

the requesting devices may be one of processor units and agents.

11. The method of claim 7, wherein the requesting devices may be one of processor units and agents.

12. The computer program product of claim 2, wherein:

the requesting devices may be one of processor units and agents.

* * * * *